(12) United States Patent
Oami

(10) Patent No.: US 6,334,646 B1
(45) Date of Patent: Jan. 1, 2002

(54) MOVABLE ROOF HAVING A DRAINAGE STRUCTURE

(75) Inventor: Kotaro Oami, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/565,765

(22) Filed: May 5, 2000

(30) Foreign Application Priority Data

May 6, 1999 (JP) ............................................ 11-126269

(51) Int. Cl.$^7$ ................................................ B60J 10/12
(52) U.S. Cl. .................. 296/213; 296/216.09; 49/476.1
(58) Field of Search ........................ 296/216.06–216.09, 296/213; 49/476.1

(56) References Cited

U.S. PATENT DOCUMENTS

| | | | |
|---|---|---|---|
| 3,894,371 A | * 7/1975 | Yamaha ................. | 49/476.1 X |
| 3,927,493 A | * 12/1975 | Tsuneishi et al. .......... | 49/476.1 |
| 4,971,308 A | * 11/1990 | Herlemann et al. . | 296/216.09 X |
| 5,466,508 A | 11/1995 | Brocke et al. ............... | 428/122 |
| 5,516,186 A | * 5/1996 | Scherf et al. .......... | 296/216.09 |

FOREIGN PATENT DOCUMENTS

| | | | | |
|---|---|---|---|---|
| DE | 42 14 489 A1 | 11/1993 | | |
| DE | 43 08 214 C2 | 9/1994 | | |
| DE | 199 63 276 A 1 | 7/2000 | | |
| GB | 2173845 | * 10/1986 | ................. | 49/476.1 |
| GB | 2 266 742 A | 11/1993 | | |
| JP | 55-46010 | 3/1980 | | |
| JP | 55-85309 | 6/1980 | | |
| JP | 58-48527 | 4/1983 | | |
| JP | 58-121738 | 8/1983 | | |
| JP | 59-114123 | 7/1984 | | |
| JP | 63-156812 | 10/1988 | | |
| JP | 3-230 | 1/1991 | | |
| JP | 5-185839 | 7/1993 | | |
| JP | 405185839 | * 7/1993 | ............ | 296/216.09 |
| JP | 6-23811 | 3/1994 | | |

* cited by examiner

*Primary Examiner*—Dennis H. Pedder
(74) *Attorney, Agent, or Firm*—Morgan & Finnegan, LLP

(57) ABSTRACT

A weather strip is attached to the periphery of a plate and a frame. A hollow space is formed in the weather strip. A first groove is formed in the weather strip to engage the plate. A through hole connects the first groove to the hollow space. A drain hole extends downward from the hollow space. Water sometimes enters the first groove, and the through hole and the drain hole drain this water. The arrangement of the various parts facilitates extrusion and simplifies the manufacturing process.

13 Claims, 2 Drawing Sheets ically, the present invention relates to a drainage
MOVABLE ROOF HAVING A DRAINAGE STRUCTURE

BACKGROUND OF THE INVENTION

The present invention relates to a movable roof panel or opening and closing an opening in the roof of an automobile. More specifically, the present invention relates to a drainage structure that discharged water from a space between the panel and a weather strip.

As shown in FIG. 2, an opening is formed in a roof 2 of an automobile. A movable roof panel, or a sliding roof panel 1, closes the opening. A weather strip 5 is attached to the periphery of the sliding panel 1. The weather strip 5 prevents air and water from passing through a space between the sliding panel 1 and the edge of the opening when the automobile is running.

As shown in FIG. 3, the sliding panel 1 includes a transparent window 13 and a frame 3. The weather strip 5 is fitted between the frame 3 and the window 13. A groove 14 is formed in the weather strip 5.

When the transparent panel 13 is made of synthetic resin, the thermal expansion coefficient of the window 13 differs greatly from that of the metal frame 3. Therefore, the window 13 is expanded and deformed by heat. To permit the thermal deformation of the window 13, a clearance 14a is formed between the window 13 and the weather strip 5.

However, this weakens the seal between the weather strip 5 and the window 13. Water sometimes enters the clearance 14a between the weather strip 5 and the window 13. To drain water from the clearance 14a, a drainpipe 15 is formed in the weather strip 5. The drainpipe 15 is connected to the clearance 14a and extends downward. The drainpipe 15 drains water from the clearance 14a to a trough 12.

A space 8 is formed along the entire periphery of the weather strip 5 to obtain the appropriate elasticity. An air hole (not shown) for releasing air in the space 8 is formed at a certain location on the weather strip 5.

If the cross-sectional shape of the weather strip 5 were entirely uniform, the entire weather strip 5 could be fully formed by extrusion. However, in the prior art, the drainpipe is independently formed and is then attached to the extrusion portion of the weather strip 5. Accordingly, another mold for making the drainpipe 15 is necessary. Also, the frame 3 includes a through hole such that the drainpipe extends downward. Therefore, the manufacture and assembly of the product shown in FIG. 3 is complicated.

As shown in FIG. 3, the drainpipe 15 projects from an inner part of the weather strip 5, in other words, from a location located inward from the edge of the opening. Therefore, the trough 12 must extend inward from the edge of the opening. This narrows the opening. Also, when the sliding panel 1 is opened, the sliding panel 1 is moved downward first and is then inclined and moved rearward. Then, the sliding panel 1 is accommodated between a ceiling panel and the roof 2. When the sliding panel 1 is moved downward, the weather strip 5 is pushed upward by the friction between the panel 13 and the weather strip 5, which is may detach the weather strip 5 from the frame 3.

SUMMARY OF THE INVENTION

An objective of the present invention is to provide a movable roof that is easily installed and has a drain structure maximizing the actual opening of the roof the vehicle.

To achieve the above objective, the present invention provides a weather strip to be attached to the periphery of a plate and a frame. The weather strip includes a hollow space, a first groove for engaging the plate, a through hole connecting the first groove to the hollow space, and a drain hole extending downward from the hollow space.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
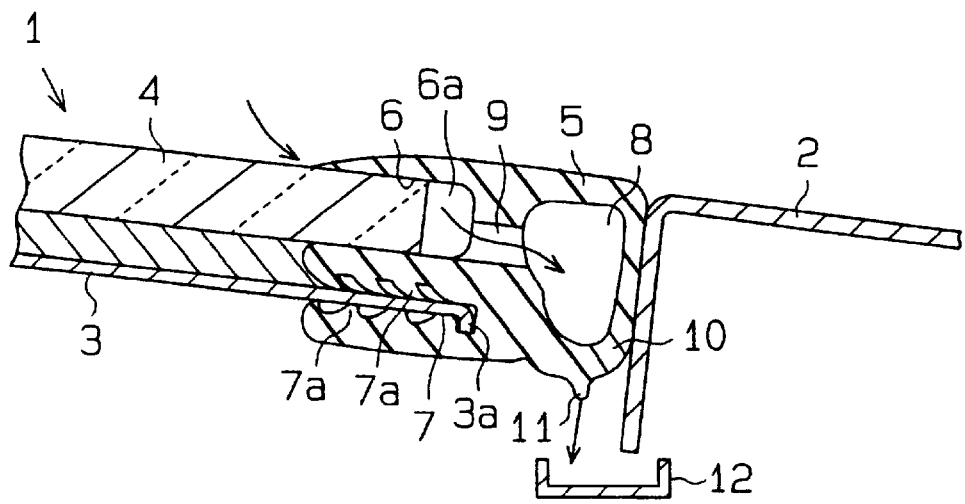
FIG. 1 is a partial enlarged cross-sectional view of a movable roof panel having a drain structure according to one embodiment of the present invention.
Figure 2:
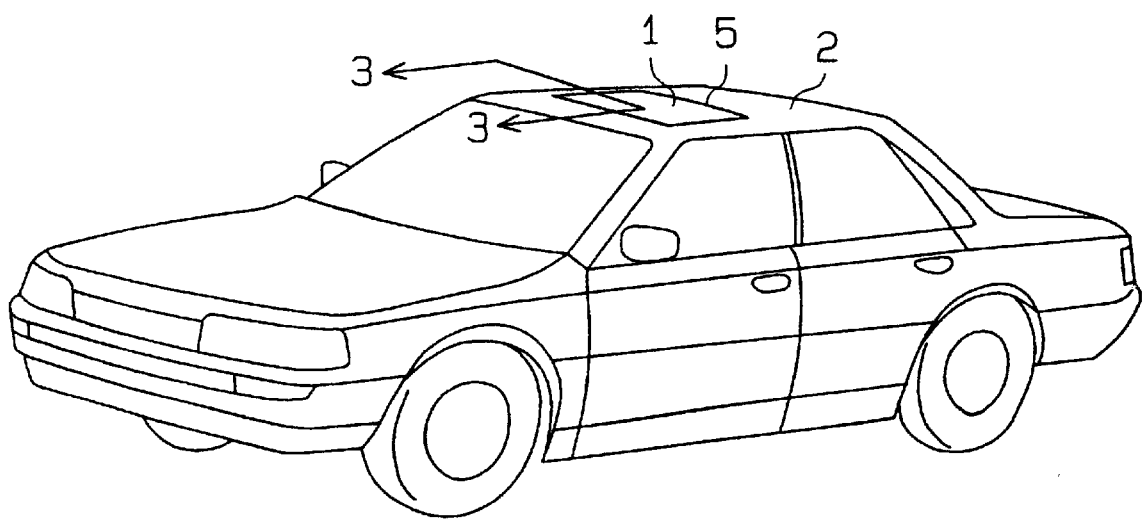
FIG. 2 is a perspective view of an automobile having a prior art sliding roof.

A sliding roof panel 1 having a drainage structure according to one embodiment of the present invention will now be described with reference to FIG. 1. The sliding roof panel 1 closes an opening in a roof 2. The sliding roof panel 1 includes a metal frame 3, a transparent polycarbonate window plate 4, and a weather strip 5 attached to the peripheries of the frame 3 and the plate 4. The frame 3 is coupled to the plate 4 by an adhesive.

The weather strip 5 is shaped to correspond to the peripheries of the frame 3 and the plate 4. The weather strip 5 includes first and second grooves 6, 7, which are parallel. Inclined projections 7a are formed in the second groove 7. An engagement portion 3a is formed at the periphery of the frame 3a to extend downward by a predetermined length. In the present embodiment, the engagement portion 3a and the projections 7a form an anchor for preventing the weather strip from separating from the plate 3.

The weather strip 5 includes a space 8 to provide elasticity. A through hole 9 connects the first groove 6 to the space 8. A clearance 6a is formed between the weather strip 5 and the end of the plate 4. The clearance 6a allows thermal deformation (or expansion) of the plate 4. Water leakage into the clearance 6a through between the weather strip and the plate 4 flows to the space 8 through the through hole 9.

The weather strip 5 includes a drain hole 10, which extends diagonally downward from the space 8. A lip 11 is formed on a lower part of the weather strip 5. The water in the space 8 is drained to a trough 12 through the drain hole 10 and from the lip 11. The through hole 9 and the drain hole 10 are located at a predetermined part of the sliding roof 1. There may be more than one through hole 9 and more than one drain hole 10.

The through hole 9 of the weather strip 5 also serves to release air. As shown in FIG. 1, the periphery of the frame 3 is below the plate 4 and does not interfere with the through hole 9. Therefore, there is no need for a hole in the frame 3 to permit passage of water.

Figure 3:
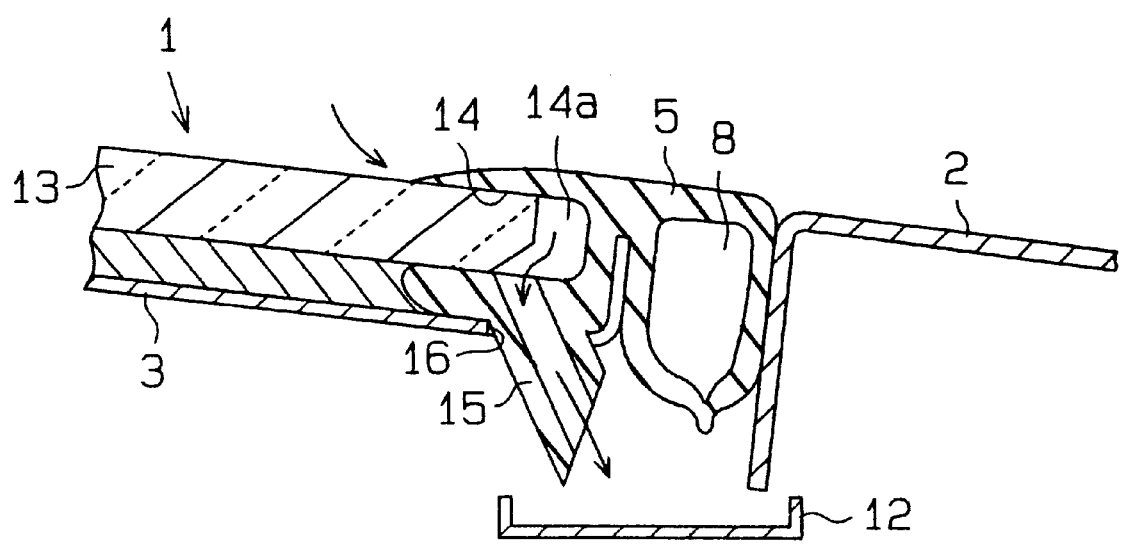
FIG. 3 is a cross-sectional view taken along the line 3—3 of FIG. 2.

When attaching the weather strip 5 to the frame 3, there is no need to position the drainpipe 15 with respect to a through hole 16 of the frame 3, as required in the prior art product of FIG. 3. This increases the efficiency of assembly. Also, dislocation of the weather strip 5 from the frame 3 is prevented even if the weather strip 5 is pushed upward when the sliding roof 1 is moved downward. Further, water in the clearance 6a is continuously led to the trough 12 through the through hole 9 and the drain hole 10, which increases the efficiency of drainage. Further, since the outlet of the drain hole 10 is located near the edge of opening, the trough 12 is not required to extend inward from the edge of the opening by a great distance. This increases the opening area compared to that of FIG. 3.

The present invention is not limited to the sliding roof panel 1. The present invention may be employed to various types of roofs such as a roof panel that moves horizontally after inclining, a roof panel that moves horizontally after moving downward vertically, and a roof panel that opens only by inclining.

The present invention may also be applied to a sunroof panel in which the weather strip 5 does not directly contact the roof 2 and another member is arranged around the opening. In other words, the present invention may be applied to a sunroof in which an upward or downward force from friction is applied to the weather strip 5.

The material of the frame 3 is not limited to metal and the material of the plate 4 is not limited to polycarbonate. The frame 3 may be made of other metals such as aluminum or nonmetal materials. The plate 4 may be made of synthetic resins such as acrylic. The plate 4 may be made of materials other than synthetic resin. The clearance 6a may be formed according to the difference between the thermal coefficients of the frame 3 and the plate 4.

The first and second grooves 6, 7 need not be parallel. The second groove 7 may be arranged in any way as long as the periphery of the frame 3 is located below the lower surface of the plate 4.

The anchor need not be a combination of the engagement portion 3a and the projections 7a. Further, the drain hole 10 may extend vertically.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A weather strip to be attached to the periphery of a plate and a frame, wherein the weather strip contacts a member that is adjacent to the plate, the weather strip comprising:
   a hollow space;
   a first groove for engaging the plate;
   a through hole connecting the first groove to the hollow space;
   a lip formed on a lower part of the weather strip, wherein the lip is located in the vicinity of the member; and
   a drain hole extending downward from the hollow space, wherein the drain hole has an outlet, and the outlet is located between the lip and the member.

2. The weather strip according to claim 1, wherein the through hole and the drain hole are located outward of the frame, wherein the hollow space is located in the vicinity of a roof.

3. The weather strip according to claim 1 further including a second groove for engaging the frame, wherein the second groove is located below the first groove, and the frame is anchored to the second groove to prevent the frame from separating from the second groove.

4. The weather strip according to claim 3, wherein the second groove is parallel to the first groove.

5. The weather strip according to claim 3, wherein the second groove includes a plurality of inclined projections for engaging the frame.

6. The weather strip according to claim 3, wherein the frame includes an engaging portion that is bent downward for engaging the weather strip within the second groove.

7. A weather strip to be attached to the periphery of a plate and a frame, wherein the weather strip contacts a member that is adjacent to the plate, the weather strip comprising:
   a hollow space;
   a lip formed on a lower part of the weather strip, wherein the lip is located in the vicinity of the member;
   a first groove for engaging the plate, wherein the hollow space surrounds the first groove;
   a through hole for connecting the first groove to the hollow space; and
   a drain hole extending downward from the hollow space, wherein the drain hole is located below the through hole, wherein the drain hole has an outlet, and the outlet is located between the lip and the member.

8. A movable roof panel for closing and opening an opening located in the top of an automobile, the movable roof panel comprising:
   a frame;
   a plate supported by the frame;
   a weather strip attached to the periphery of a plate and the periphery of the frame, wherein the weather strip contacts a member that is adjacent to the plate, the weather strip comprising:
     a hollow space;
     a first groove for engaging the plate;
     a through hole connecting the first groove to the hollow space;
     a lip formed on a lower part of the weather strip wherein the lip is located in the vicinity of the member; and
     a drain hole extending downward from the hollow space wherein the drain hole has an outlet, and the outlet is located between the lip and the member.

9. The weather strip according to claim 8, wherein the through hole and the drain hole are located outward of the frame, wherein the hollow space is located in the vicinity of a roof.

10. The weather strip according to claim 8 further including a second groove for engaging the frame, wherein the second groove is located below the first groove, and the frame is anchored to the second groove to prevent the frame from separating from the second groove.

11. The weather strip according to claim 10, wherein the second groove is parallel to the first groove.

12. The weather strip according to claim 10, wherein the second groove includes a plurality of inclined projections for engaging the frame.

13. The weather strip according to claim 10, wherein the frame includes an engaging portion that is bent downward for engaging the weather strip within the second groove.

* * * * *

UNITED STATES PATENT AND TRADEMARK OFFICE
CERTIFICATE OF CORRECTION

PATENT NO.    : 6,334,646 B1
DATED         : January 1, 2002
INVENTOR(S)   : Kataro Oami It is certified that error appears in the above-identified patent and that said Letters Patent is hereby corrected as shown below:

Column 1,
Line 6, please delete "panel or" and insert therefor -- panel for --;
Line 65, please delete "roof the vehicle" and insert therefor -- roof of the vehicle --.

Signed and Sealed this

Twenty-first Day of May, 2002

Attest:

Attesting Officer

JAMES E. ROGAN
Director of the United States Patent and Trademark Office